UNITED STATES PATENT OFFICE 2,634,252

METHOD OF POLYMERIZING ORGANO-SILOXANES WITH ALKOXIDES AND ALCOHOL-HYDROXIDE COMPLEXES

Earl Leathen Warrick, Pittsburgh, Pa., assignor to Dow Corning Corporation, Midland, Mich., a corporation of Michigan No Drawing. Application May 25, 1949,
Serial No. 95,375

4 Claims. (Cl. 260—46.5)

This invention relates to a method of polymerizing completely condensed organopolysiloxanes.

This invention is a continuation in part of the applicant's copending application, Serial No. 86,110, filed April 7, 1949, assigned to the same assignee as the present invention, and now Patent No. 2,541,137, dated February 13, 1951.

In general, the polymerization of organopolysiloxanes may proceed by means of one or more of three mechanisms. These are condensation of hydroxyl groups, rearrangement of Si—O—Si bonds and removal of hydrocarbon radicals from the silicon atoms with subsequent cross-linking. In completely condensed organosiloxanes, polymerization is accomplished by one or both of the last two methods. Many types of catalysts suitable for polymerizing organosiloxanes are known in the art. These include acids, alkali metal hydroxides, alkali metal salts of organosilanols and heavy metal salts, such as, $FeCl_3$ and $AlCl_3$.

The above catalysts are in general suitable for the production of polysiloxane liquids of relatively low viscosities, for the production of thermoset, cross-linked siloxane resins and for the production of insoluble gels usable in the production of siloxane elastomers.

However, there is a type polysiloxane which is not economically produced by using known catalysts. These polymers are solid soluble linear polymers obtained from diorganosiloxanes. Such polymers have in excess of 10,000 $R_2SiO$ units per molecule and are essentially non-flowing at room temperature. In order to produce such polymers on a commercial scale it is necessary to have a catalyst which will polymerize low molecular weight cyclic siloxanes to the desired extent in a reasonable length of time and without producing cross-links in the polymer. Heretofore known siloxane catalysts do not possess this combination of properties.

It is an object of this invention to provide a method of polymerizing organosiloxanes in a short time without removing organic groups from the silicon atoms. Another object is to provide a method for obtaining solid soluble diorganosiloxane polymers. Another object is to provide diorganopolysiloxanes suitable for use in silica filled siloxane rubbers. Other advantages will be apparent from the following description.

In accordance with this invention a completely condensed diorganopolysiloxane in which the organic radicals are of the group alkyl and monocyclicaryl radicals is maintained in intimate contact with a catalyst of the type ROM or $$(ROH)_x \cdot MOH$$

where R is an alkyl radical of less than six carbon atoms, $x$ has a value from 0.5 to 2.5 and M is potassium or sodium. The catalyst is employed in amount from one alkali metal atom per 100 silicon atoms to one alkali metal atom per 25,000 silicon atoms. The siloxane and the catalyst are maintained in contact until an increase in viscosity of the siloxane is obtained.

The catalysts employed in this invention are alkali metal alkoxides and complexes of alkali metal hydroxides and alcohols. The former may be prepared by reacting an alcohol with an alkali metal under substantially anhydrous conditions. The complexes may be prepared by refluxing sodium or potassium hydroxides with an alcohol and then removing the excess alcohol by distillation.

A preferred method is to heat solid alkali metal hydroxides with from a 3 to 4 mol excess of the alcohol until the alkali dissolves. During the refluxing, water is removed azeotropically. After the alkali has dissolved, the solution may be filtered free of any unreacted material such as carbonates. Alcohol is then removed by distillation preferably at reduced pressure whereby the solid complex is obtained.

The complexes consist essentially of compounds of the type $(ROH)_x \cdot MOH$ where $x$ has a value from 0.5 to 2.5. The materials are dry powders which are hydroscopic and should be sealed upon storage. The precise value of $x$ obtained for any complex will depend upon the relative amounts of alcohol and alkali employed and the temperature used to remove excess alcohol from the reaction mixture. When a complex containing 2.5 mols of alcohol per mol of hydroxide is desired, the alcohol should be removed at substantially room temperature. If a complex containing a lower relative proportion of alcohol to hydroxide is desired, such a material may be obtained by subjecting the complexes to temperatures of about 100° C. and maintaining the material in a vacuum. Under these conditions, alcohol is gradually removed from the complex and any desired state of alcoholysis can thereby be obtained.

The alcohols employed to make the catalysts of this invention are methyl, ethyl, propyl, butyl, and amyl alcohols and any alcoholic isomer thereof.

It is to be understood that both the alkali metal alkoxides and the complexes employed herein may contain small amounts of uncombined sodium or potassium hydroxides.

Whereas the catalysts of this invention may be employed to polymerize hydroxyl containing siloxanes, their most valuable application is with completely condensed diorganopolysiloxanes. Completely condensed diorganopolysiloxanes of the type herein employed are well known in the art as is their method of preparation.

Polymerization of the siloxane is effected by mixing it with the catalyst either with or without a solvent. Polymerization takes place at temperatures ranging from below room temperature up to and above 250° C. The rate of polymerization for a given catalyst ratio and for a given siloxane increases with the temperature. However, at temperatures above 260° C. depolymerization will take place with the resulting splitting out of low molecular weight cyclic siloxanes. The preferred temperature range is from 100° C. to 250° C.

The ratio of catalysts to siloxane is one alkali metal atom per 100 to 25,000 silicon atoms. It has been found that the polymer size obtainable varies inversely with the amount of catalyst employed. Thus, the lower the metal to silicon ratio the higher the polymer resulting. However, if the amount of catalyst is below 1 alkali metal atom to 25,000 Si atoms, the rate of polymerization is too slow to be practicable.

The catalysts of this invention polymerize completely condensed diorganopolysiloxanes by means of siloxane bond rearrangement and without removal of organic groups. Thus, in the high polymers thereby obtained all of the polymer units are of the type $R_2SiO$.

The effectiveness of the catalysts is illustrated by the fact that cyclic tetrasiloxanes have been converted in less than 25 minutes to polysiloxanes which are benzene soluble and which have penetrometer readings of less than 360 (expressed in tenths mm.) in 10 seconds at 25° C. These penetrometer readings were determined in accordance with ASTM–D217–44T.

The polymers obtained by using the catalysts of this invention are particularly adaptable for use in improved siloxane elastomers as is more fully disclosed in the applicant's copending application, Serial Number 86,110, filed April 7, 1949. For this purpose it is preferred to use polymers which are composed of dialkyl siloxane units or polysiloxanes which are copolymers containing at least 60 mol percent dialkyl siloxane units the remainder being units of the type $RR'SiO$ where R is a monocyclic aryl radical and $R'$ is alkyl or monocyclic aryl.

Example 1

1000 g. of octamethylcyclotetrasiloxane was placed in a 3 neck flask equipped with a thermometer, stirrer and reflux condenser. When the temperature of the siloxane reached 165° C., 0.14 g. of a potassium hydroxide-isopropanol complex having a neutral equivalent of 193.5 was added. This gave a ratio of Si/K of 4470 to 1. In 25 minutes, the polymer became stiff enough to stall the stirrer and was then poured into a dish. The polymer was then heated at 150° C. for 3½ hours. The resulting polymer was completely soluble in benzene and had a penetrometer reading of 190 in 30 seconds at 25° C. This polymer had an intrinsic viscosity of about 1.57 which corresponds to a molecular weight of 804,600.

Example 2

A series of polymers was prepared with various catalysts indicated in the table below. In each case, the siloxane employed was octamethylcyclotetrasiloxane. The indicated catalysts were added to the siloxane at a temperature of 165° C. and the mixture was agitated until the stirrer would no longer revolve. The polymer was then poured into a dish and thereafter heated at 150° C. from the time indicated. The results of several runs together with the penetrometer reading and character of the polymer is indicated in the table below.

For the sake of comparison, a run made with 35% aqueous KOH is included.

TABLE

| Catalyst | Conc. Si: K, mols. | Time at 165° C. | Time in Oven, 150° C., hr. | Penetrometer Distance in 10ths mm. | Penetrometer Time, sec. | Character |
|---|---|---|---|---|---|---|
| $[(CH_3)_2CHOH]_{2.3} \cdot KOH$ | 5000/1 | 18 min | 1 | 262 | 30 | soluble in benzene. |
|  |  |  | 5 | 225 | 30 |  |
| KOH | 5000/1 | 1½ hr | 10 | 328 | 10 | insoluble in benzene and rubbery. |
|  |  |  | 17 | 309 | 10 |  |
| $(CH_3)_2CHOK$ | 5000/1 | 18 min | 1 | 264 | 30 | soluble in benzene. |
|  |  |  | 3 | 243 | 30 |  |
|  |  |  | 5 | 235 | 30 |  |
| $C_2H_5OK$ | 5000/1 | 30 min | 1 | 370 | 15 | Do. |
|  |  |  | 3 | 328 | 15 |  |
| $[(CH_3)_2CHOH]_{2.3} \cdot KOH$ | 13,500/1 | 1½ hr | 6 | 231 | 30 | Do. |

The above results show that not only does KOH require longer to polymerize the siloxane but also the polymer obtained is insoluble and rubbery in character. This indicates that the hydroxide has caused removal of some of the methyl groups.

Example 3

A mixture of 1000 grams of octamethylcyclotetrasiloxane, 198 grams of octaphenylcyclotetrasiloxane and 108 grams of xylene was heated to 160° C. The potassium hydroxide-isopropanol complex having a neutral equivalent of 193.5 was added in amount of one potassium atom per 5000 silicon atoms. Heating was continued at 160° C. for 4½ hours and xylene was removed. The copolymer was then poured into a dish and allowed to cool. It had a penetrometer reading below 380 in 10 seconds at 25° C. and was completely soluble in benzene.

Example 4

A mixture of 1000 grams of octamethylcyclotetrasiloxane and 59.1 grams of completely condensed phenylmethylsiloxane was heated to 160° C. A potassium hydroxide isopropanol complex having a neutral equivalent of 193.5 was added in amount of one potassium atom per 5000 silicon atoms. Heating at 160° C. was continued for 23 minutes whereupon the viscous polymer was poured into a dish and allowed to cool. The polymer had a penetrometer reading of 260 in 30 seconds at 25° C. and was completely soluble in benzene.

*Example 5*

A mixture of 177 grams of completely condensed phenylmethylsiloxane and 644 grams of octamethylcyclotetrasiloxane was heated to 160° C. A potassium hydroxide isopropanol complex having a neutral equivalent of 193.5 was added in amount of one potassium atom per 5000 silicon atoms. Heating at 160° C. was continued for 30 minutes whereupon the viscous copolymer was poured into a dish and allowed to cool. The material had a penetrometer reading of 250 in 30 seconds at 25° C. and was completely soluble in benzene.

*Example 6*

The following alkali metal hydroxide alcohol complexes were prepared by placing the solid hydroxide in a 3 mol excess of the alcohol refluxing the mixture until the alkali was dissolved and then removing the excess alcohol at 30° C. under reduced pressure until a dry solid material was obtained. The complexes and their neutral equivalents are given in the table below:

| Complex | Neutral Equivalent |
|---|---|
| $CH_3OH \cdot NaOH$ | 74.7 |
| $[(CH_3)_3COH]_{0.87} \cdot NaOH$ | 104.8 |
| $[(CH_3)_2CHOH]_{2.5} \cdot NaOH$ | 196.6 |
| $[(CH_3)_2CHOH]_{1.85} \cdot KOH$ | 167 |
| $(C_2H_5OH)_{0.7} \cdot NaOH$ | 72.2 |

When these complexes are mixed with hexamethylcyclotrisiloxane, octamethylcyclotetrasiloxane and decamethylcyclopentasiloxane in amount of one alkali metal atom per 5000 Si atoms and heated at 150° C. an increase in viscosity of the siloxane is obtained.

That which is claimed is:

1. The method of polymerizing a completely condensed liquid diorganopolysiloxane in which the organic radicals are selected from the group consisting of alkyl and monocyclic aryl radicals, which comprises maintaining the siloxane in intimate contact with a catalyst selected from the group consisting of ROM and $(ROH)_x \cdot MOH$, where R is an alkyl radical of less than six carbon atoms, $x$ has a value from 0.5 to 2.5 and M is an alkali metal selected from the group consisting of sodium and potassium, said catalyst being present in amount from one alkali metal atom per 100 silicon atoms to one alkali metal atom per 25,000 silicon atoms until a benzene soluble solid polymer having a penetrometer reading of less than 380 after ten seconds at 25° C. according to ASTM-D217-44T, is obtained.

2. The method of polymerizing a completely condensed liquid diorganosiloxane in which the organic radicals are selected from the group consisting of alkyl and monocyclic aryl radicals, which comprises maintaining in intimate contact the liquid siloxane and potassium isopropoxide in amount from one alkali metal atom per 100 silicon atoms to one alkali metal atom per 25,000 silicon atoms at a temperature between 100° C. and 250° C. until a benzene soluble solid polymer having a penetrometer reading of less than 380 after 10 seconds at 25° C. according to ASTM-D217T-44T, is obtained.

3. The method of polymerizing a completely condensed liquid diorganosiloxane in which the organic radicals are selected from the group consisting of alkyl and monocyclic aryl radicals, which comprises maintaining in intimate contact the siloxane and $[(CH_3)_2CHOH]_x \cdot KOH$ where $x$ has a value from 0.5 to 2.5, in amount from one alkali metal atom per 100 silicon atoms to one alkali metal atom per 25,000 silicon atoms at a temperature between 100° C. and 250° C. until a benzene soluble solid polymer having a penetrometer reading of less than 380 after 10 seconds at 25° C. according to ASTM-D217-44T, is obtained.

4. The method of polymerizing a liquid completely condensed dimethylpolysiloxane which comprises maintaining it in intimate contact with a catalyst selected from the group consisting of ROM and $(ROH)_x \cdot MOH$ where R is an alkyl radical of less than six carbon atoms, $x$ has a value from 0.5 to 2.5 and M is selected from the group consisting of sodium and potassium, said catalyst being present in amount from 1 alkali metal atom per 100 silicon atoms to 1 alkali metal atom per 25,000 silicon atoms at a temperature between 100° C. and 250° C. until a benzene soluble solid polymer having a penetrometer reading of less than 380 after 10 seconds at 25° C. according to ASTM-D217-44T, is obtained.

EARL LEATHEN WARRICK.

REFERENCES CITED

The following references are of record in the file of this patent:

UNITED STATES PATENTS

| Number | Name | Date |
|---|---|---|
| 2,443,353 | Hyde et al. | June 15, 1948 |
| 2,490,357 | Hyde | Dec. 6, 1949 |
| 2,518,160 | Mathes | Aug. 8, 1950 |

OTHER REFERENCES

Conant et al.: The Chemistry of Organic Compounds, 3rd ed., McMillan, 1947, page 17.

Karrer: Organic Chemistry, 2nd English edition, 1946, page 82.